(12) United States Patent
Straeter

(10) Patent No.: US 8,543,238 B2
(45) Date of Patent: Sep. 24, 2013

(54) METHOD AND APPARATUS FOR CHANGING SEED VARIETIES AT THE ROW UNIT OF A PLANTER

(76) Inventor: James E. Straeter, Rochester, IN (US)

( * ) Notice: Subject to any disclaimer, the term of this patent is extended or adjusted under 35 U.S.C. 154(b) by 716 days.

(21) Appl. No.: 12/688,935

(22) Filed: Jan. 18, 2010

(65) Prior Publication Data

US 2011/0178632 A1 Jul. 21, 2011

(51) Int. Cl.
*G06F 7/00* (2006.01)
*B65G 59/04* (2006.01)
*A01C 7/06* (2006.01)
*A01C 7/00* (2006.01)
*A01C 5/00* (2006.01)

(52) U.S. Cl.
USPC ........... 700/219; 700/218; 700/213; 221/211; 111/63; 111/174; 111/175; 111/11; 111/178

(58) Field of Classification Search
None
See application file for complete search history.

(56) References Cited

U.S. PATENT DOCUMENTS

| | | | |
|---|---|---|---|
| 5,170,730 A | 12/1992 | Swallow | |
| 5,915,313 A | 6/1999 | Bender et al. | |
| 5,938,071 A * | 8/1999 | Sauder | 221/211 |
| 6,193,175 B1 | 2/2001 | Andersson et al. | |
| 6,285,938 B1 | 9/2001 | Lang et al. | |
| 6,595,148 B2 | 7/2003 | Meyer et al. | |
| 6,688,244 B1 | 2/2004 | Meyer et al. | |
| 6,845,724 B2 * | 1/2005 | Mayerle et al. | 111/174 |
| 7,021,224 B2 | 4/2006 | Mayerle et al. | |
| 7,347,149 B2 | 3/2008 | Mayerle et al. | |
| 2006/0278726 A1 | 12/2006 | Holly | |
| 2007/0039528 A1* | 2/2007 | Sauder et al. | 111/171 |
| 2011/0232549 A1* | 9/2011 | Applegate et al. | 111/11 |

* cited by examiner

*Primary Examiner* — Yolanda Jones
(74) *Attorney, Agent, or Firm* — Zarley Law Firm, P.L.C.

(57) ABSTRACT

A planting system for planting multiple seed varieties. The planting system includes a planter having a plurality of tanks and a plurality of row units. A plurality of seed meters are included in of the plurality of the row units. A seed transport belt is disposed below the plurality of seed meters to transport seed from each of the plurality of seed meters into a seed tube. Each of the plurality of seed meters is engaged and disengaged by a clutch, and the seed transport belt is disposed below the plurality of seed meters in an angled orientation.

13 Claims, 3 Drawing Sheets

METHOD AND APPARATUS FOR CHANGING SEED VARIETIES AT THE ROW UNIT OF A PLANTER

BACKGROUND OF THE INVENTION

This invention relates to a planter which plants multiple seed varieties. More specifically, this invention is directed to a planter with multiple row units that transition from planting one seed variety to another without interruption and a method of using the same.

Traditional agricultural planters have been supplied with a single seed variety, wherein the selected seed consisted of whatever particular seed variety the farmer hoped to be the most suitable for the entire field that was to be planted. However, in recent years, developments in technology and science, including but not limited to the development of highly specialized seed hybrids, detailed soil analysis, and the integration of satellite/GPS navigation and mapping systems with agricultural implements, have transformed planting into a highly detailed and specialized enterprise. By utilizing such advances in science and technology, instead of selecting one particular seed variety to plant based simply upon the attributes of the seed itself, farmers wishing to optimize attributes of a crop in terms of yield and the like are able to determine and select which particular seed variety is most suitable to be planted in a particular part of a field based upon the attributes of the selected seed and the field conditions present in a particular part of a field. As a result, a need has arisen for a planting system which has the ability to transition between multiple types of seed varieties to deposit the seed variety that is most suitable in response to changing field conditions during planting.

Although planters have been developed with the functionality to plant multiple types of seed, existing planters suffer from numerous disadvantages. Namely, existing planters transition from one seed variety to another at the tank or seed reservoir which feeds various row units, and due to the amount of seeds that remain in cue in the seed hose feeding the row unit and the unit meter itself, existing systems thus lack the ability to transition from planting one seed variety to another with a high degree of precision, speed, and control. Furthermore, in addition to problems with accurate and controlled seed placement during changeover, existing planters experience difficulties such as skips in depositing seeds and gaps in rows during seed variety transition. Therefore, a need exists to provide a planter which plants multiple seed varieties that overcomes these problems.

Therefore, a principal object of the invention is to provide a planter which seamlessly and continuously transitions from one seed variety to another without gaps in the deposit of seeds.

It is yet another object of this invention to provide a planter which transitions from one seed variety to another at a row unit to provide accurate seed placement.

It is still another object of this invention to provide a planter with multiple meters in a row unit, each of which fed by a separate tank and supplied with a different seed variety.

A further object of this invention is to provide a planter with meters which are actuated by an air clutch.

It is a further object of this invention to provide a controller to selectively activate and deactivate the meters to coordinate change from one seed variety to another prevent interruptions in the deposit of seeds while maintaining accurate placement of the desired type of seed in the desired location.

It is still another object of this invention to provide a non-horizontal belt beneath the meters to deposit seed into a seed tube and eliminate seed bounce.

These and other objects, features or advantages of the present invention will become apparent from the specification and claims.

BRIEF SUMMARY OF THE INVENTION

A planting system for planting multiple seed varieties includes a planter having a plurality of tanks and a plurality of row units. A plurality of seed meters are included in the plurality of the row units. A seed transport belt is disposed below the plurality of seed meters to transport seed from each of the plurality of seed meters into a seed tube. Each of the plurality of seed meters is engaged and disengaged by a clutch, and the seed transport belt is disposed below the plurality of seed meters in an angled orientation.

DETAILED DESCRIPTION OF THE PREFERRED EMBODIMENT OF THE INVENTION

Figure 1:
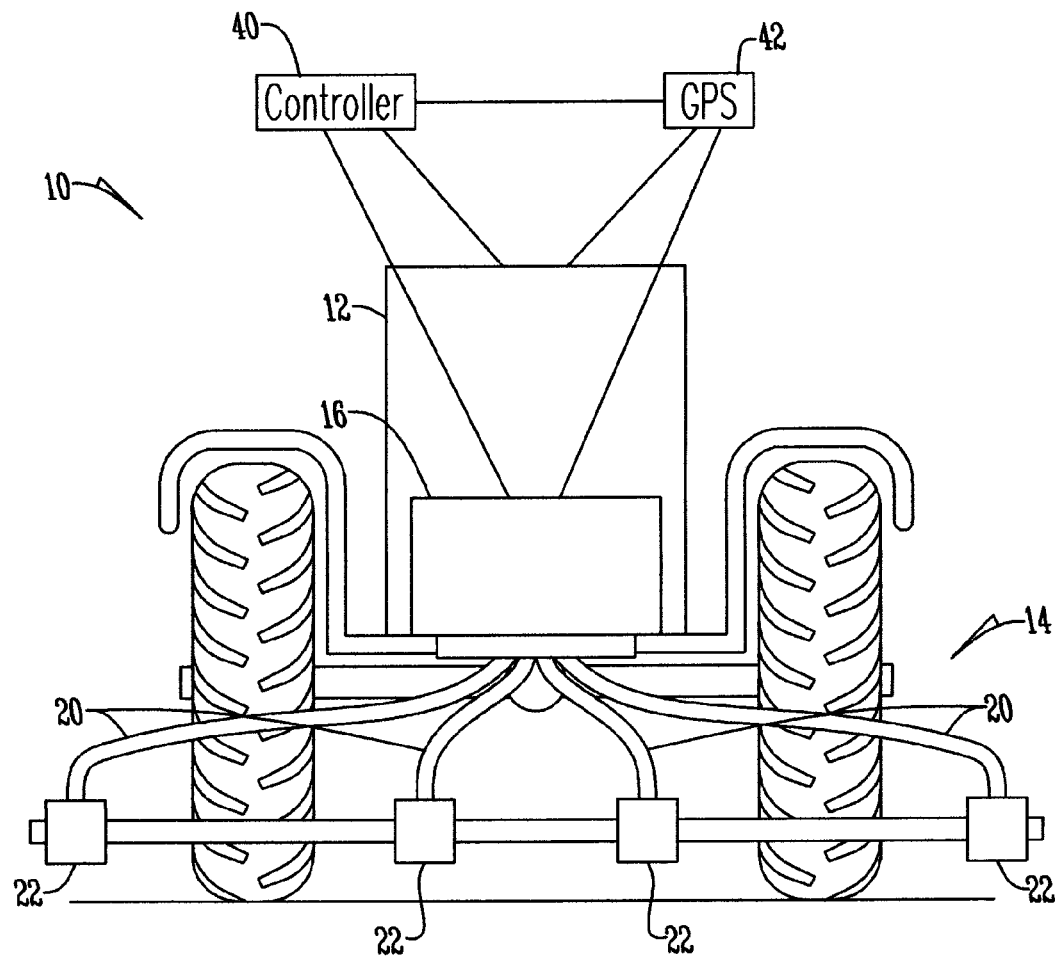
FIG. 1 is a perspective view of the present planting system.
Figure 2:
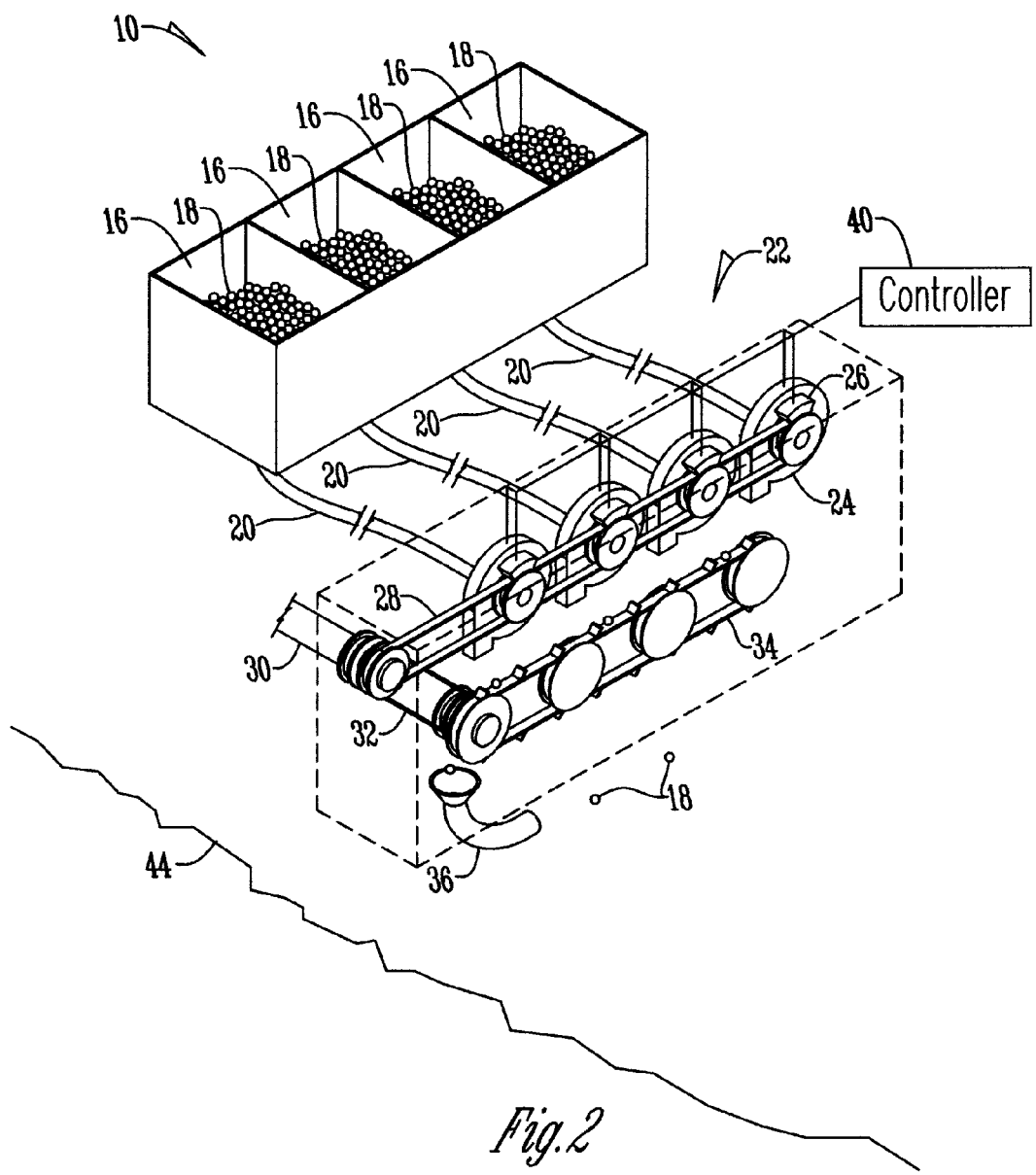
FIG. 2 is a perspective view of a row unit of the planting system.
Figure 3:
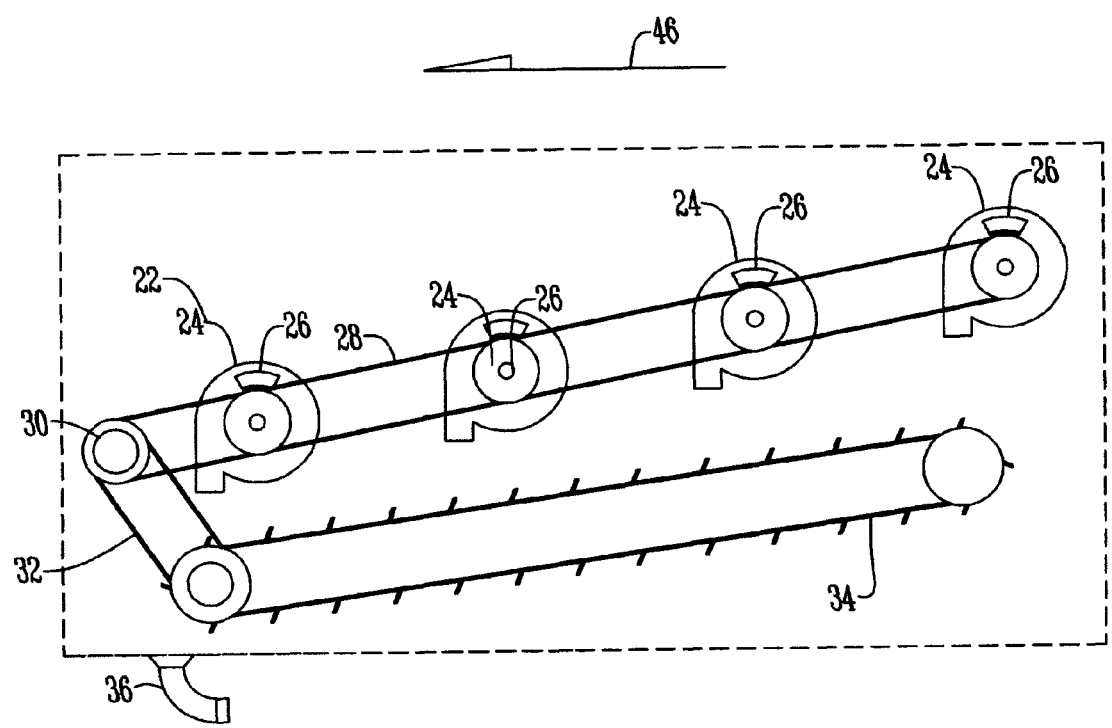
FIG. 3 is a perspective view of alternate embodiment of a row unit of the planting system.

Referring to the figures, a planting system 10 includes a planter 14 which in one embodiment is pulled behind an agricultural implement 12 such as a tractor. The planter 14 has a plurality of separate seed tanks 16, wherein each seed tank 16 is supplied with and holds a different variety of seed 18. In one embodiment, four seed tanks 16 are provided. Alternatively, the planter 14 includes as few as two seed tanks 16 or in yet another embodiment, the planter 14 is provided with three or more than four seed tanks 16, wherein the number of seed tanks 16 provided depends upon the specific needs and type of farming operation for which the planter 14 is intended. The planter 14 also includes a plurality of row units 22. Each row unit 22 includes a plurality of seed meters 24. In one embodiment, each row unit includes four seed meters 24. Alternatively, each row unit 22 includes two seed meters 24 or in yet another embodiment, each row unit 22 is provided with three or more than four seed meters 24, wherein the number of seed meters 24 provided in the row units 22 depends upon the specific needs and type of farming operation for which the planter 14 is intended. Each seed meter 24 of each row unit 22 is supplied with a different seed variety 18 via a seed distribution conduit 20 extending from the corresponding seed tank 16 which holds the variety of seed 18 which the particular seed meter 24 distributes. In one embodiment, the seed distribution conduit 20 is a hose. Alternatively, the seed distribution conduit 20 is any channel or means capable of supplying seed from a tank 16 to a seed meter 24 as known in the art. Therefore, in one embodiment, the number of seed meters 24 will correspond to the number of seed tanks 16, wherein each seed tank 16 supplies one particular seed meter 24 in each of the plurality of row units 22 via seed distribution conduits 20 such that each seed meter 24 in each row unit 22 is supplied by a different seed tank 16. Each seed meter 24 also includes a clutch 26 capable of selectively engaging and disengaging each seed meter's 24 operation. In one embodiment, clutch 26 is an air clutch. Alternatively, clutch 26 is any other suitable clutch as known in the art. The seed meters 24 are driven by a seed meter drive 28, which in one embodiment is a chain. Each row unit's 22 seed meter drive chain 28 is driven by a drive shaft 30.

A horizontal seed transport belt 34 is positioned under each of the seed meters 24 to receive the seed 18 distributed by each seed meter 24 and convey the seed 18 to a seed tube 36 at one end of the seed transport belt 34 to be deposited into the ground 44 for planting, wherein the seed transport belt 34 deposits seed 18 into the seed tube 36 for all seed meters 24. The seed transport belt 34 is driven by a transport belt drive 32, which in one embodiment is a chain. Additionally, in one embodiment, the seed transport belt drive 32 is also driven by drive shaft 30 such that the rate of actuation of the seed transport belt 34 corresponds to that of the seed meter drive 28 and seed meters 24.

In an alternate embodiment, the plurality of seed meters 24 are aligned in a non-horizontal, angled orientation within each row unit 22. The seed transport belt 34 extends beneath each of the seed meters 24 in a non-horizontal, downwardly angled orientation which corresponds to the angled orientation of the seed meters 24. In this manner, as the seed 18 is being dropped to the belt 34 from the seed meters 24, the downward momentum of the seed 18 is matched by both the downward angle and direction of the belt 34 such that seed 18 bounce is dissipated.

Each seed meter 24 and clutch 26 within the plurality of row units 22 is connected to a controller 40 with software to actuate and coordinate the operation of the seed meters 24. In one embodiment, the controller 40 is in electronic communication with instrumentality of the agricultural implement 12 in addition to being in electronic communication with a GPS/satellite navigation and mapping system 42 which is in electronic communication with the agricultural implement 12 and planter 14.

In operation, each seed tank 16 is supplied with a different desired seed variety 18. Once the planting operation begins and the planting system 10 is activated, the controller 40 determines which particular seed variety 18 is to be deposited into the ground 44 by each individual row unit 22 based upon software programmed into the controller 40, electronic communication/commands from the GPS/satellite navigation and mapping system 42, or both. The controller 40 sends a signal to the appropriate seed meter 24 charged with the selected seed variety 18 to be planted and the clutch engages the seed meter 24 to begin operating. Once activated, the seed meter 24, driven by the seed meter drive chain 28, drops seeds 18 onto the seed transport belt 34, which in turn conveys the seeds 18 to a seed tube 36 to be deposited into the ground 44.

Once the controller 40 determines that a different seed variety 18 needs to be planted by a particular row unit 22 based upon the controller's software, position data/commands received from the a GPS/satellite navigation and mapping system 42, or both, the controller 40 sends a signal to deactivate the seed meter 24 that is to be stopped, allowing the stopped seed meter 24 to remain charged with seed 18, and activates another seed meter 24 that is to begin depositing the new seed variety 18 as a function of both the distance between the seed meter 24 that is to be deactivated and the seed meter 24 that is activated and the location that the seed 18 from the newly activated seed meter 24 is to be deposited. For example, if the first of a series of four seed meters 24 is to be deactivated (corresponding to the leading seed meter 24 with respect to the direction of travel 46) and the fourth of a series of four seed meters 24 is to be activated (corresponding to the trailing seed meter 24 with respect to the direction of travel 46), the software of the controller 40 starts or activates the fourth seed meter 24 not only before the first seed meter 24 has stopped depositing seed 18 on the belt 34, but also before the row unit 22 reaches the precise location where the fourth seed meter's 24 seed variety 18 is to be deposited into the ground 44 as a function of the speed that the planter 14 is traveling, the rotation and length of the transport belt 34 and the distance between the first and fourth seed meter 24 such that the length of the belt 34 was filled with seed 18 before the first meter 24 was deactivated. In this manner, the planting system 10 provides for seamless and continuous transition from one seed variety to another without gaps or interruptions in the deposit of seeds and more accurate and controlled seed placement. As a result at the very least all of the stated objectives have been met.

It will be appreciated by those skilled in the art that other various modifications could be made to the device without the parting from the spirit and scope of this invention. All such modifications and changes fall within the scope of the claims and are intended to be covered thereby.

What is claimed is:

1. A planting system for planting multiple seed varieties comprising:
   a planter having a plurality of tanks and a plurality of row units;
   a plurality of seed meters in each of the plurality of the row units;
   a seed transport belt disposed below the plurality of seed meters to transport seed from each of the plurality of seed meters into a seed tube so as to plant multiple seed varieties wherein the seed transport belt is in an angled orientation.

2. The planting system of claim 1 wherein each of the plurality of seed meters is engaged and disengaged by a clutch.

3. The planting system of claim 2 wherein the clutch is an air clutch.

4. The planting system of claim 1 wherein the each of the plurality of seed meters is connected to a controller which selectively activates and deactivates the seed meters.

5. The planting system of claim 1 wherein the seed meters within each of the plurality of the row units are driven by a seed meter drive.

6. The planting system of claim 5 wherein the seed meter drive is driven by a drive shaft.

7. The planting system of claim 6 wherein the seed transport belt is driven by a transport belt drive connected to the drive shaft.

8. A method of planting multiple seed varieties comprising the steps of:
   providing a planter having a plurality of tanks and a plurality of row units;
   providing a plurality of seed meters in each of the plurality of the row units;
   providing a seed transport belt disposed below the plurality of seed meters to transport seed from each of the plurality of seed meters into a seed tube; and
   providing a controller which actuates the plurality of seed meters to change from a first variety of seed to a second variety of seed deposited by any one of the plurality of the units wherein the controller selectively actuates and deactuates the plurality of seed meters based upon a travel speed of the planter.

9. The method of claim 8 wherein changing from the first to a second variety of seed deposited by one of the plurality of row units requires a deactivation of one of the plurality of seed meters and the activation of another of the plurality of seed meters within one of the plurality of row units.

10. The method of claim 9 wherein the controller selectively actuates and deactuates the plurality of seed meters to change from the first variety of seed to the second variety of seed such that the seed transport belt delivers seed into the seed tube without interruption.

11. The method of claim 10 wherein the controller selectively actuates and deactuates the plurality of seed meters based upon the distance between the seed meter that is to be deactivated and the seed meter that is activated.

12. The method of claim 10 wherein the controller selectively actuates and deactuates the plurality of seed meters based upon the location where a seed from the newly activated seed meter is to be deposited.

13. A planting system for planting multiple seed varieties comprising:
- a planter having a plurality of tanks and a plurality of row units;
- a plurality of seed meters in each of the plurality of the row units;
- a seed transport belt disposed below the plurality of seed meters to transport seed from each of the plurality of seed meters into a seed tube at one end of the transport belt so as to plant multiple seed varieties.

\* \* \* \* \*

UNITED STATES PATENT AND TRADEMARK OFFICE
CERTIFICATE OF CORRECTION

| | | |
|---|---|---|
| PATENT NO. | : 8,543,238 B2 | Page 1 of 1 |
| APPLICATION NO. | : 12/688935 | |
| DATED | : September 24, 2013 | |
| INVENTOR(S) | : James E. Straeter | |

It is certified that error appears in the above-identified patent and that said Letters Patent is hereby corrected as shown below:

In the Claims

Column 5, line 1, after the word "claim," delete "9" and insert --8--

Signed and Sealed this
Eleventh Day of November, 2014

Michelle K. Lee
*Deputy Director of the United States Patent and Trademark Office*